US009396039B1

(12) United States Patent
Arguelles et al.

(10) Patent No.: US 9,396,039 B1
(45) Date of Patent: Jul. 19, 2016

(54) SCALABLE LOAD TESTING USING A QUEUE

(71) Applicant: Amazon Technologies, Inc., Reno, NV (US)

(72) Inventors: Carlos Alejandro Arguelles, Shoreline, WA (US); Ramakrishnan Hariharan Chandrasekharapuram, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 172 days.

(21) Appl. No.: 14/032,324

(22) Filed: Sep. 20, 2013

(51) Int. Cl.
G06F 9/50 (2006.01)
G06F 9/455 (2006.01)

(52) U.S. Cl.
CPC .......... *G06F 9/5083* (2013.01); *G06F 9/45533* (2013.01); *G06F 9/5077* (2013.01); *G06F 9/5088* (2013.01)

(58) Field of Classification Search
None
See application file for complete search history.

(56) References Cited

U.S. PATENT DOCUMENTS

| 5,349,682 | A | * | 9/1994 | Rosenberry | G06F 9/3001 712/31 |
| 5,666,523 | A | * | 9/1997 | D'Souza | 712/229 |
| 6,975,965 | B2 | | 12/2005 | Jager et al. | |
| 7,127,446 | B1 | * | 10/2006 | Menezes et al. | |
| 7,389,453 | B2 | | 6/2008 | Udell | |
| 7,500,241 | B1 | * | 3/2009 | Flockhart et al. | 718/102 |
| 7,765,081 | B2 | | 7/2010 | Blouin et al. | |
| 7,945,416 | B2 | | 5/2011 | Haemel et al. | |
| 8,086,720 | B2 | | 12/2011 | Breese et al. | |
| 8,185,619 | B1 | | 5/2012 | Maiocco et al. | |
| 2006/0059140 | A1 | * | 3/2006 | Noe | G06F 17/30371 |
| 2009/0083744 | A1 | * | 3/2009 | Shimada | 718/102 |
| 2011/0099424 | A1 | | 4/2011 | Rivera Trevino et al. | |
| 2011/0138396 | A1 | * | 6/2011 | Chen | G06F 9/5066 718/105 |
| 2011/0167421 | A1 | * | 7/2011 | Soundararajan et al. | 718/1 |
| 2012/0173709 | A1 | * | 7/2012 | Li et al. | 709/224 |
| 2012/0266023 | A1 | | 10/2012 | Brown et al. | |
| 2013/0007753 | A1 | * | 1/2013 | Jain | 718/103 |
| 2014/0026122 | A1 | * | 1/2014 | Markande et al. | 717/124 |
| 2014/0115591 | A1 | * | 4/2014 | Chen | G06F 9/5027 718/102 |
| 2014/0325524 | A1 | * | 10/2014 | Zangaro | G06F 9/5083 718/105 |

OTHER PUBLICATIONS

Oracle, Oracle Projects Fundamentals, Aug. 2010, Part No. E13581-04, Release 12.1, 6-1 to 6-88.*
U.S. Appl. No. 13/466,951, filed Mar. 8, 2012, Ramakrishnan H. Chandrasekharapuram.

(Continued)

*Primary Examiner* — Abdullah Al Kawsar
*Assistant Examiner* — Jorge A Chu Joy-Davila
(74) *Attorney, Agent, or Firm* — Robert C. Kowert; Meyertons, Hood, Kivlin, Kowert & Goetzel, P.C.

(57) ABSTRACT

Methods and systems for load generation for scalable load testing are disclosed. A plurality of job descriptions are generated based on a load step description. The load step description specifies a total transaction frequency or a total number of concurrent connections for a load test of a service over a period of time. The job descriptions specify subdivisions of the total transaction frequency or the total number of concurrent connections and subdivisions of the period of time. The job descriptions are placed in a job queue. A plurality of worker hosts remove the job descriptions from the job queue and concurrently execute local jobs based on the job descriptions.

17 Claims, 14 Drawing Sheets

(56) References Cited

OTHER PUBLICATIONS

U.S. Appl. No. 13/466,955, filed Mar. 8, 2012, Ramakrishnan H. Chandrasekharapuram.

U.S. Appl. No. 13/864,905, filed Apr. 17, 2013, Carlos Alejandro Arguelles.

U.S. Appl. No. 13/466,943, filed Mar. 8, 2012, Ramakrishnan H. Chandrasekharapuram.

* cited by examiner

SCALABLE LOAD TESTING USING A QUEUE

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Ensuring that these services can scale to handle abnormally high loads is a non-trivial problem. For example, instead of testing an actual production system (i.e., a system that is currently open to real-world clients), software engineers often create a scaled-down copy of a production system with a smaller number of hosts and test the scaled-down system with a smaller, proportional load. However, such an approach may fail to detect problems that would only surface on the larger scale of the production system.

When testing whether a production system can scale to handle a large load, software engineers are often in a situation where a single-host load generator is not able to generate sufficient load to provide an adequate test. In such a scenario, the engineers may resort to running the single-host load generator concurrently on multiple hosts. One drawback to this approach is the requirement of managing the individual load generators to ensure that they are jointly applying the desired amount of load. Such a task may require nearly constant manual oversight and re-adjustment. There is no guarantee that every individual load generator will provide the same maximum load, even if all the load generators have the same hardware and software configuration. Additionally, if individual load generators experience hardware failures, the overall system will not reach its target load.

The task of providing a synchronized, controlled load using multiple hosts is often tackled with complex architectures involving a centralized database and a master/server paradigm. In such an approach, the master typically knows which slaves are able to generate load, and the master distributes the load accordingly. During execution of the load test, the master must be in periodic contact with the slaves to decide if they are working or not, to calculate metrics such as overall TPS (transactions per second), and to determine whether it needs to ask individual hosts to increase their load to reach the target load. Accordingly, such master/slave systems require a high degree of coupling between the components. Achieving such a high degree of coupling often proves expensive for the various components and for the network interconnections. Additionally, if a slave temporarily loses its network connection to the server, the server may conclude that the slave is dead and reassign the slave's load to another component. However, if it turns out the slave was alive and applying load, a greater amount of load than expected may be applied, potentially to the detriment of the service under test.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for scalable load testing using a queue are described. Using the systems and methods described herein, a controller may write load jobs to a queue. Any suitable number of worker hosts may listen to the queue and execute the job requests issued by the controller. In this manner, the controller and the workers may be decoupled in a horizontally scalable load testing solution. Each worker may self-balance based on the amount of load it can generate. The controller may determine whether the workers are collectively applying the prescribed amount of load by monitoring the queue size. For example, if the queue size is growing, then the controller may be putting load jobs in the queue at a rate faster than the workers are able to dequeue.

In some embodiments, the controller can perform a fast emergency shutdown or request additional hardware to be provisioned.

Figure 1:
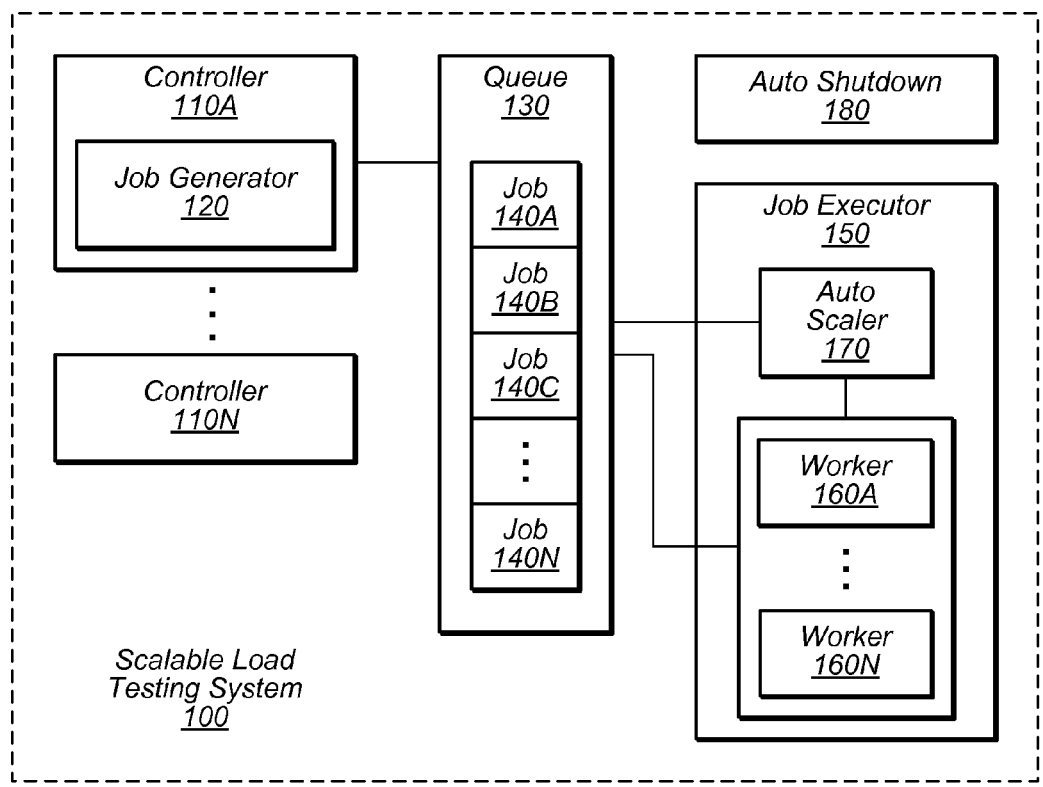
FIG. 1 illustrates an example system environment for scalable load testing using a queue, according to one embodiment.

FIG. 1 illustrates an example system environment for scalable load testing using a queue, according to one embodiment. In some embodiments, a scalable load testing system 100 is configured to perform a load test of one or more services. For example, the service under test may be a network-based service that is implemented by one or more computers configured to process client requests. The scalable load testing system 100 may include one or more controllers, such as controllers 110A-110N. Each of the controllers 110A-110N may include a job generator such as job generator 120. In one embodiment, a controller such as controller 110A may use the functionality provided by the job generator 120 to generate descriptions of jobs to be executed for the load test. As will be discussed below, the job generator 120 may generate multiple job descriptions for a single step of load. In this manner, the tasks associated with a single load step may be distributed among multiple workers 160A-160N for concurrent execution during the load test. In one embodiment, the scalable load testing system 100 is configured to scale the number of controllers, e.g., based on the number of job descriptions that need to be generated for a load test.

The controllers 110A-110N may place the job descriptions in a queue 130 at one or more points in time during the load test. The job descriptions may also be referred to herein as jobs, such as jobs 140A, 140B, and 140C through 140N as shown in FIG. 1. Although jobs 140A-140N are shown for purposes of illustration and example, it is contemplated that the queue 130 may store any suitable number of jobs, including zero jobs. The queue 130 may be implemented by a queue service that manages queue data and communicates with entities such as the controllers 110A-110N and the workers 160A-160N. The queue service may manage multiple queues at any given time.

To implement a load test, a job executor 150 may provision a plurality of workers, such as workers 160A-160N, also referred to herein as worker hosts. Each of the workers 160A-160N may read individual job descriptions from the queue 130 and execute local jobs based on the job descriptions. In one embodiment, a worker that completes the processing of one job may then read another job description from the queue 130. Because the workers may process jobs at different rates, some individual workers may generate more load for the load test than other workers. Accordingly, each individual worker 160A-160N may self-balance based on the amount of load it can generate. In some embodiments, the workers 160A-160N may implement aspects of the service under test or may simulate a load (e.g., client requests) to be applied to the service under test.

In one embodiment, the jobs in the queue may be ordered, e.g., by the age of the job, and a worker may read the next available job (e.g., the oldest job) from the queue. In one embodiment, a job that is read from the queue by one of the workers may be marked in the queue using a suitable label such as "taken" or "invisible." A job labeled "taken" or "invisible" may remain in the queue until the queue service is notified (e.g., by the relevant worker) that the job has been completed. A completed job may then be removed from the queue. However, if the job fails to complete at one worker, or if a predefined amount of time has elapsed without a "taken" job being completed, then the job may be re-labeled using a suitable label such as "untaken" or "visible" and made available to another worker to complete. In this manner, only one worker at a time may be given the opportunity to attempt to complete a given job, and a job may be offered to a series of workers until it is successfully completed.

Although two workers 160A and 160N are shown for purposes of illustration and example, it is contemplated that the job executor 150 may employ any suitable number of workers to implement a load test. The number of workers may be adjusted prior to the load test or during the load test to ensure that enough workers are available to produce a sufficient load for the load test. In one embodiment, an auto-scaling functionality 170, also referred to herein as an auto-scaler, may automatically adjust the number of workers 160A-160N for a load test. In one embodiment, the controller 110A may monitor the load test and request the provisioning of one or more additional workers, e.g., from the job executor 150. In one embodiment, the workers 160A-160N are generic such that any worker can execute any job associated with the load test. In some embodiments, the workers 160A-160N are heterogeneous in terms of their configurations and/or performance characteristics.

The job executor 150 may typically process many tasks in parallel, and the use of the job queue 130 may ensure that the next task is available for a worker as a prior task completes at the worker. In addition, the job queue 130 may effectively decouple the controllers 110A-110N from the workers 160A-160N. As a result, the controllers and workers may scale separately and independently from each other. The scalable load testing system 100 may also include an auto shutdown functionality 180. As will be described below with respect to FIG. 9, the auto shutdown functionality 180 may be used to automatically shut down any of the components associated with a load test, such as one or more of the controllers 110A-110N, the queue 130, or the workers 160A-160N, if particular criteria are met. In some embodiments, at least some portions of the scalable load testing system 100 may be provided as a network-based service (e.g., a third party service) to one or more clients for use in load testing of one or more services, e.g., services maintained by the clients.

In one embodiment, a supervisor process may monitor the controllers 110A-110N and save their state at any given time. If one of the controllers fails, the supervisor process may start a new controller and restore the state of the failed controller in order to resume a load test in progress. Due to the decoupling of the controllers 110A-110N and the workers 160A-160N, the failure and restart of a controller may be essentially invisible to the workers that are processing jobs generated by the failed controller.

In one embodiment, the scalable load testing system 100 may be operated in an interactive mode. In the interactive mode, jobs may be generated that instruct the workers to generate a particular load (e.g., a particular transaction frequency or number of concurrent connections) and maintain that load until instructed otherwise. In other words, the duration of the jobs generated in the interactive mode may be indefinite.

Figure 10:
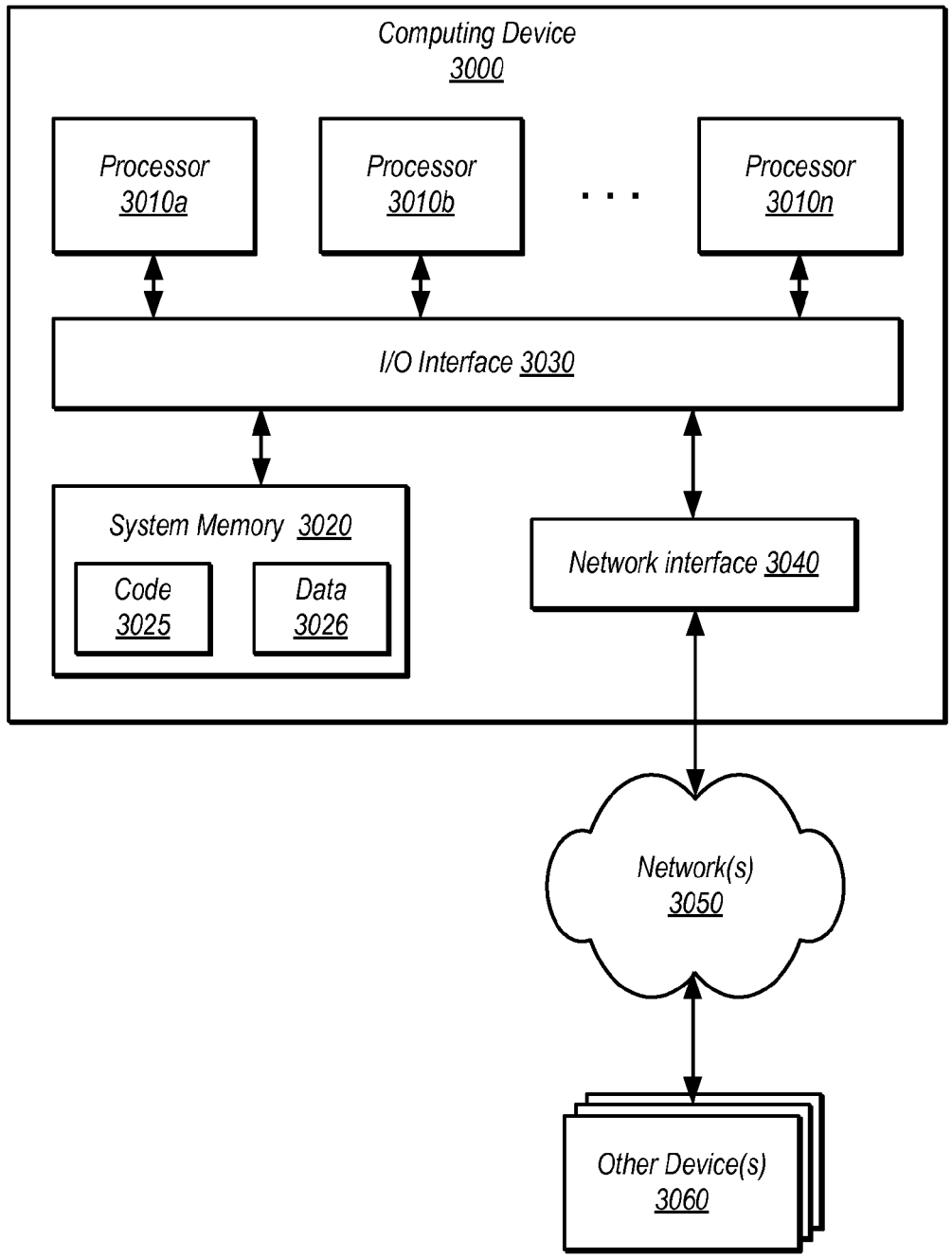
FIG. 10 illustrates an example computing device that may be used in some embodiments.

The scalable load testing system 100 may comprise one or more computing devices, any of which may be implemented by the example computing device 3000 illustrated in FIG. 10. In various embodiments, portions of the functionality of the different components (e.g., controllers 110A-110N, queue 130, workers 160A-160N, auto shutdown functionality 180) may be provided by the same computing device or by any suitable number of different computing devices. If any of the components of the scalable load testing system 100 are implemented using different computing devices, then the components and their respective computing devices may be communicatively coupled, e.g., via a network. Each of the illustrated components may represent any combination of software and hardware usable to perform their respective functions.

In some embodiments, various components of the scalable load testing system 100, such as the workers 160A-160N, may be implemented as virtual compute instances or physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 10.

Figure 2A:
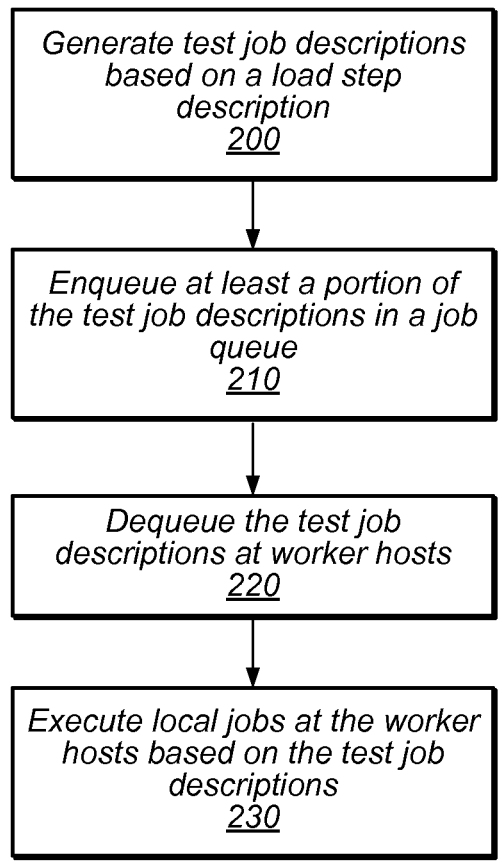
FIG. 2A is a flowchart illustrating a method for scalable load testing using a queue, according to one embodiment.

FIG. 2A is a flowchart illustrating a method for scalable load testing using a queue, according to one embodiment. As indicated in 200, test job descriptions may be generated based on a load step description. As will be described in greater detail below, the load step description may specify a duration for the load test, an operation distribution for the load test (e.g., the transaction types to be performed), and a description of the load to be generated (e.g., a transaction frequency to be maintained and/or number of concurrent connections to be established). Each test job description may specify a portion of the duration. For example, if the load step description specifies a total duration of five minutes, then each test job may specify a suitable portion such as one minute. Additionally, each test job description may specify a portion of the load to be generated. For example, if the load step description specifies a total transaction frequency of 1000 transactions per second (TPS), then the operation shown in 200 may generate 100 test job descriptions that each specify a transaction frequency of 10 TPS for a given time period. Similarly, if the load step description specifies a load of 100 concurrent connections, then the operation shown in 200 may generate 20 test job descriptions that each specify 5 concurrent connections for a given time period.

As indicated in 210, at least a portion of the test job descriptions may be enqueued in a job queue. As indicated in 220, individual ones of the test job descriptions may be dequeued or otherwise read by worker hosts. As indicated in 230, local jobs based on the test job descriptions may be executed at the worker hosts. A worker may attempt to execute each local job in accordance with the operation distribution and prescribed load (e.g., transaction frequency and/or number of concurrent connections) specified in the corresponding job description. A worker may attempt to execute each local job for the duration specified in the corresponding job description. In this manner, the total load required for a load step may be distributed among multiple worker hosts by using the job queue to decouple the workers from the controller.

Figure 2B:
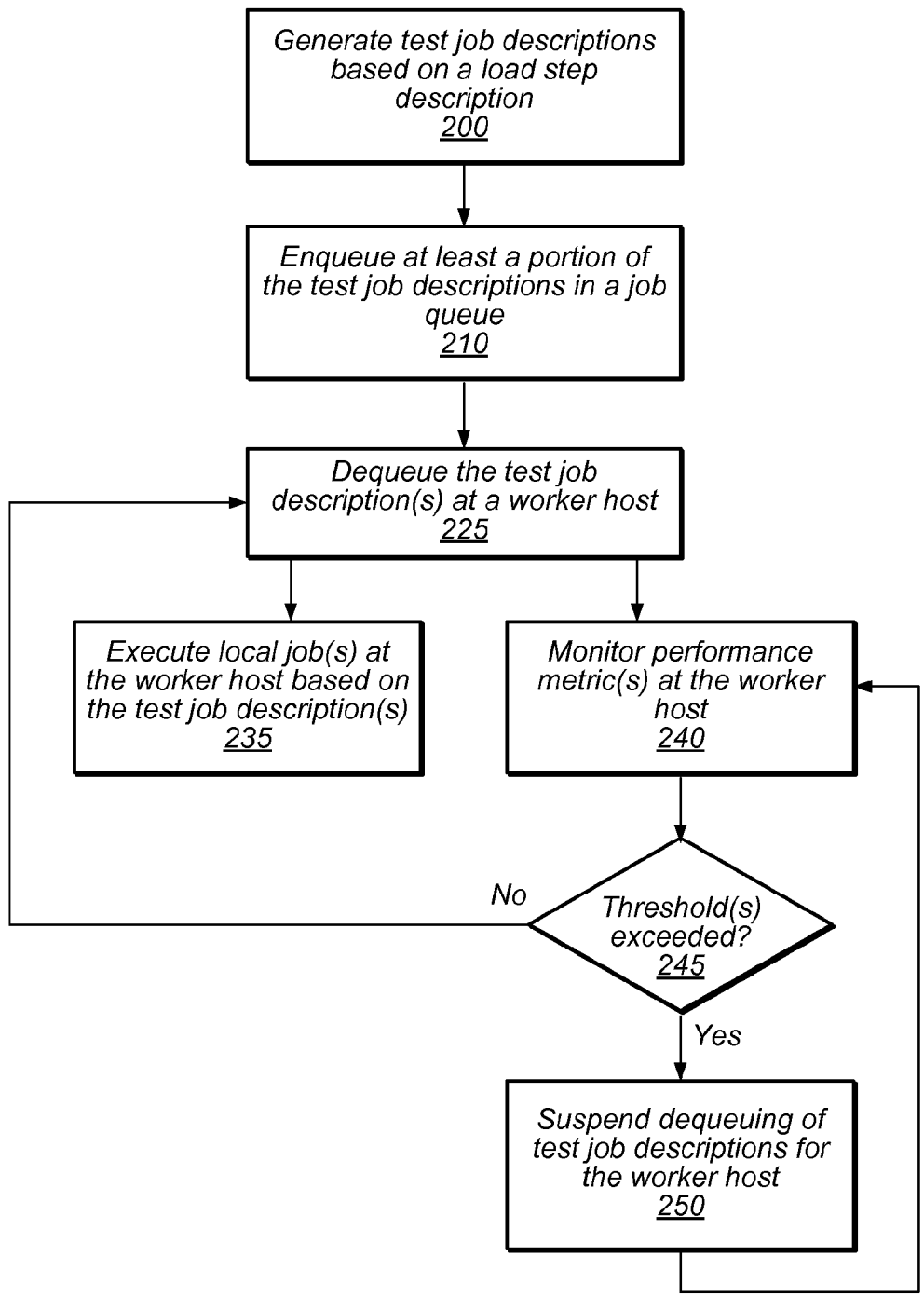
FIG. 2B is a flowchart illustrating a method for scalable load testing using a queue and including worker self-adjustment, according to one embodiment.

FIG. 2B is a flowchart illustrating a method for scalable load testing using a queue and including worker self-adjustment, according to one embodiment. As indicated in 200, test job descriptions may be generated based on a load step description. As will be described in greater detail below, the load step description may specify a duration for the load test, an operation distribution for the load test (e.g., the transaction types to be performed), and a description of the load to be generated (e.g., a transaction frequency to be maintained and/or number of concurrent connections to be established). Each test job description may specify a portion of the duration. For example, if the load step description specifies a total duration of five minutes, then each test job may specify a suitable portion such as one minute. Additionally, each test job description may specify a portion of the load to be generated. For example, if the load step description specifies a total transaction frequency of 1000 transactions per second (TPS), then the operation shown in 200 may generate 100 test job descriptions that each specify a transaction frequency of 10 TPS for a given time period. Similarly, if the load step description specifies a load of 100 concurrent connections, then the operation shown in 200 may generate 20 test job descriptions that each specify 5 concurrent connections for a given time period.

As indicated in 210, at least a portion of the test job descriptions may be enqueued in a job queue. As indicated in 225, one or more of the test job descriptions may be dequeued or otherwise read by a particular worker host. As indicated in 235, one or more local jobs based on the one or more test job descriptions may be executed at the worker host. The worker may attempt to execute each local job in accordance with the operation distribution and prescribed load (e.g., transaction frequency and/or number of concurrent connections) specified in the corresponding job description. The worker may attempt to execute each local job for the duration specified in the corresponding job description.

As indicated in 240, one or more performance metrics may be monitored at the worker host. For example, the metrics may relate to the memory, CPU, disk and/or network usage of the worker. The metrics may be collected at any suitable point, including before execution of the local job, during execution of the local job, and after execution of the local job. Any suitable techniques may be used to monitor the metrics, including instrumentation of relevant software modules. As indicated in 245, the worker host (or another suitable component, such as the job executor 150) may determine whether any of the metrics has exceeded a performance threshold. For example, the worker host may determine whether CPU usage exceeds 90%. In general, the performance thresholds may tend to indicate points at which performance may suffer. If none of the metrics exceed their corresponding thresholds, then the method may proceed, e.g., as indicated in 225. As indicated in 250, however, if any of the metrics have exceeded their corresponding thresholds, then the worker may suspend or temporarily stop dequeuing additional test job descriptions until all the metrics have returned to an acceptable level. In this manner, each worker may self-adjust to the level of load its resources are sufficient to provide.

Figure 2C:
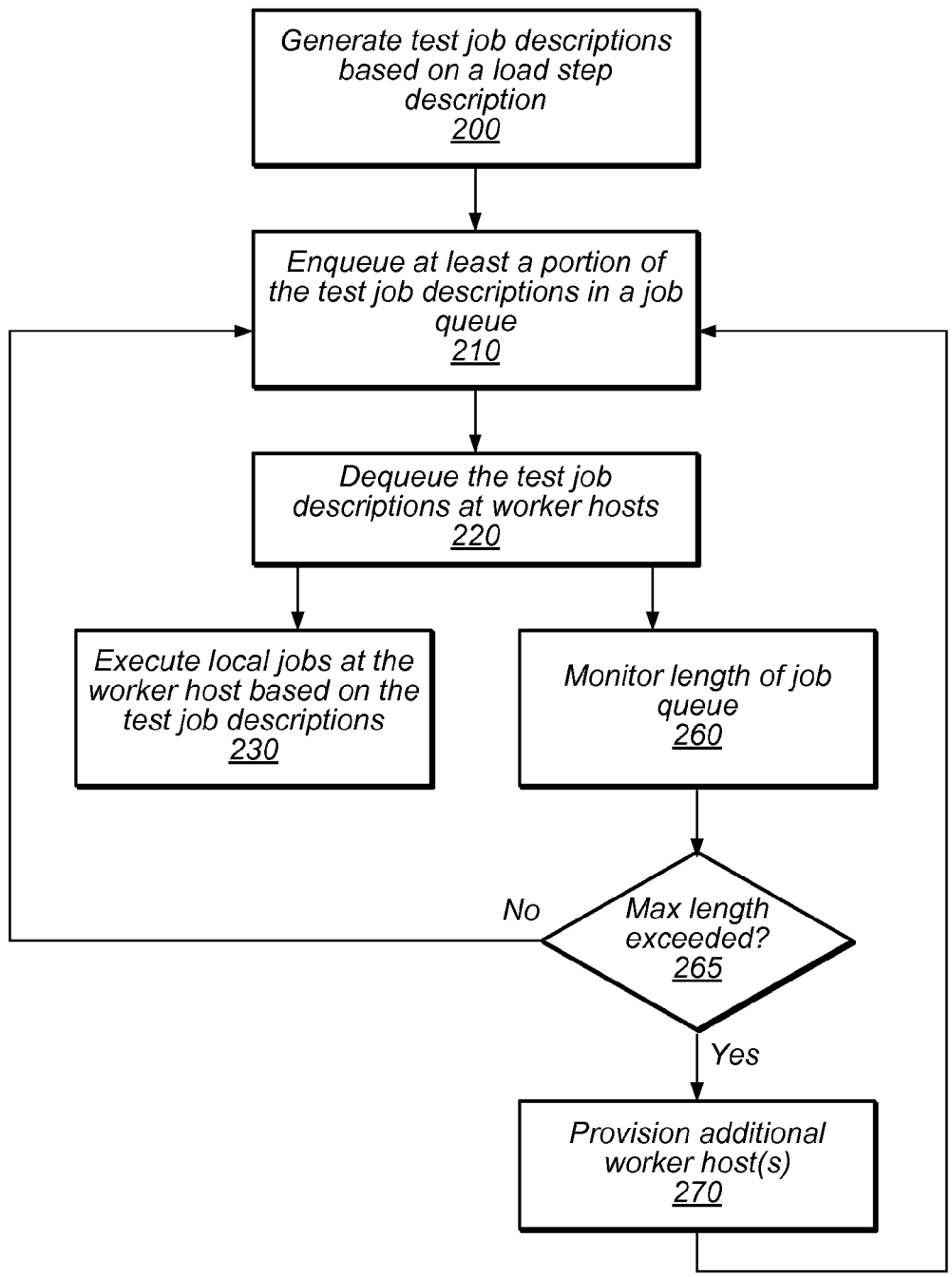
FIG. 2C is a flowchart illustrating a method for scalable load testing using a queue and including queue monitoring by a controller, according to one embodiment.

FIG. 2C is a flowchart illustrating a method for scalable load testing using a queue and including queue monitoring by a controller, according to one embodiment. As indicated in 200, test job descriptions may be generated based on a load step description. As will be described in greater detail below, the load step description may specify a duration for the load test, an operation distribution for the load test (e.g., the transaction types to be performed), and a description of the load to be generated (e.g., a transaction frequency to be maintained and/or number of concurrent connections to be established). Each test job description may specify a portion of the duration. For example, if the load step description specifies a total duration of five minutes, then each test job may specify a suitable portion such as one minute. Additionally, each test job description may specify a portion of the load to be generated. For example, if the load step description specifies a total transaction frequency of 1000 transactions per second (TPS), then the operation shown in 200 may generate 100 test job descriptions that each specify a transaction frequency of 10 TPS for a given time period. Similarly, if the load step description specifies a load of 100 concurrent connections, then the operation shown in 200 may generate 20 test job descriptions that each specify 5 concurrent connections for a given time period.

As indicated in 210, at least a portion of the test job descriptions may be enqueued in a job queue. As indicated in 220, individual ones of the test job descriptions may be dequeued or otherwise read by worker hosts. As indicated in 230, local jobs based on the test job descriptions may be executed at the worker hosts. A worker may attempt to execute each local job in accordance with the operation distribution and prescribed load (e.g., transaction frequency and/or number of concurrent connections) specified in the corresponding job description. A worker may attempt to execute each local job for the duration specified in the corresponding job description.

As indicated in 260, the length of the job queue may be monitored. The length of the job queue may relate to the number of untaken jobs in the queue. The length of the queue may be monitored by any suitable component, such as the controller 110A responsible for generating the job descriptions in the load test. As indicated in 265, the controller 110A (or another suitable component) may determine whether a maximum length of the job queue has been exceeded. In one embodiment, the controller 110A may determine whether the job queue contains an excessive number of untaken jobs after the workers have had sufficient time to read the jobs from the queue. In general, the maximum queue length may be configured such that numbers in excess of the maximum tend to indicate that the job executor 150 does not have sufficient resources to perform the load test. If the maximum length is not exceeded, then the method may proceed, e.g., as indicated in 210. As indicated in 270, however, if the length of the job queue exceeds the maximum queue length, then any suitable component (e.g., the controller 110A) may provision or request the provisioning of one or more additional worker hosts. The method may proceed, e.g., as indicated in 210, and additional worker hosts may continue to be provisioned, as indicated in 270, until the maximum queue length is not exceeded. In this manner, a controller may ensure that a sufficient number of workers are taking part in the load test.

Figure 2D:
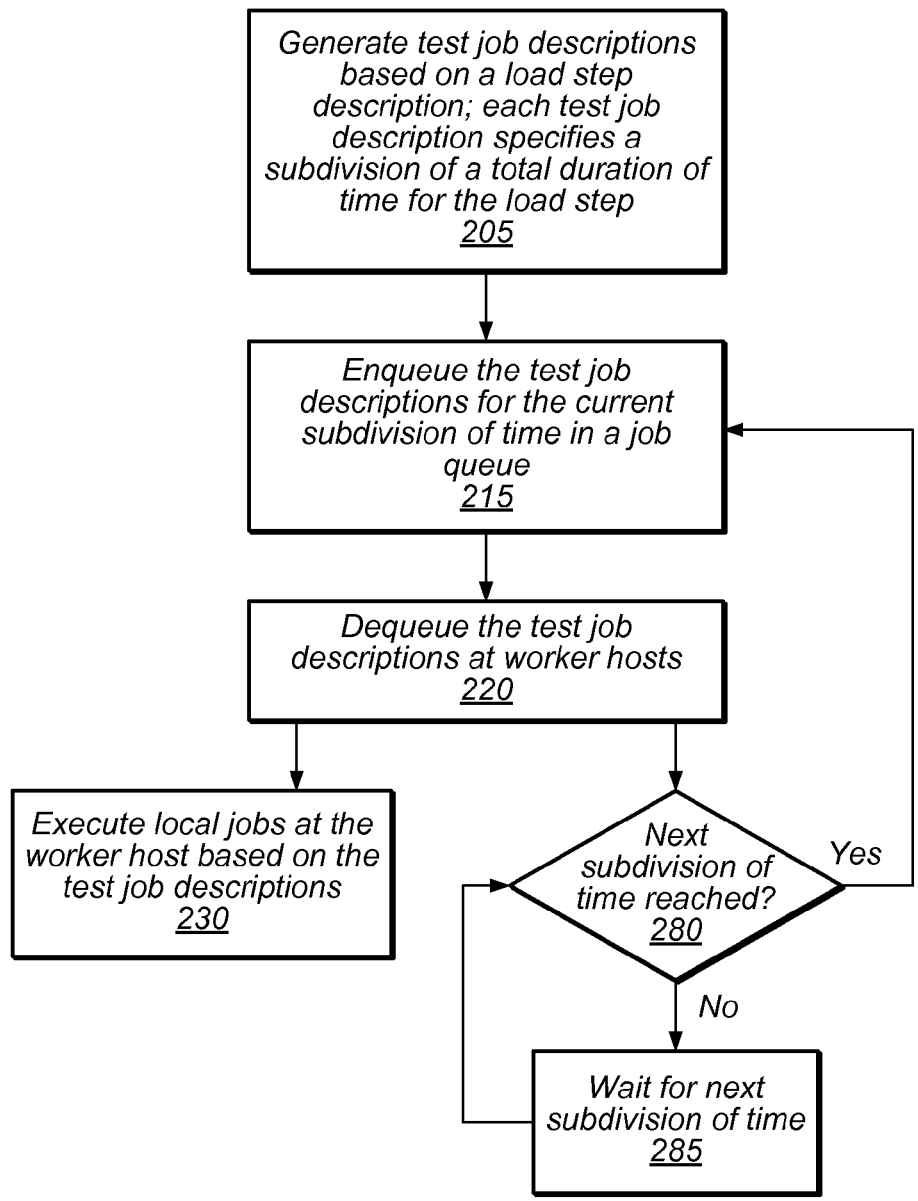
FIG. 2D is a flowchart illustrating a method for scalable load testing using a queue and based on subdivisions of the test duration, according to one embodiment.

FIG. 2D is a flowchart illustrating a method for scalable load testing using a queue and based on subdivisions of the test duration, according to one embodiment. As indicated in 205, test job descriptions may be generated based on a load step description. As will be described in greater detail below, the load step description may specify a duration for the load test, an operation distribution for the load test (e.g., the transaction types to be performed), and a description of the load to be generated (e.g., a transaction frequency to be maintained and/or number of concurrent connections to be established). Each test job description may specify a subdivision of the duration. For example, if the load step description specifies a total duration of five minutes, then each test job may specify a suitable subdivision such as one minute. Additionally, each test job description may specify a portion of the load to be generated. For example, if the load step description specifies a total transaction frequency of 1000 transactions per second (TPS), then the operation shown in 200 may generate 100 test job descriptions that each specify a transaction frequency of 10 TPS for a given time period. Similarly, if the load step description specifies a load of 100 concurrent connections, then the operation shown in 200 may generate 20 test job descriptions that each specify 5 concurrent connections for a given time period.

As indicated in 215, the test job descriptions for the current subdivision of time may be enqueued in a job queue. In one embodiment, the test job descriptions may be enqueued in a job queue according to their respective subdivisions of time. For example, if the job descriptions for a load step having a total duration of five minutes are divided into five subdivisions of one minute each, then the job descriptions specifying the first minute may be enqueued at the start of the load step. Additionally, the job descriptions specifying the second minute may be enqueued at or shortly before the expiration of the first minute of the load step. Similarly, the job descriptions specifying the next minute may be enqueued at or shortly before the expiration of the previous minute of the load step, until all the subdivisions of the total duration have been encountered.

As indicated in 220, individual ones of the test job descriptions may be dequeued or otherwise read by worker hosts. As indicated in 230, local jobs based on the test job descriptions may be executed at the worker hosts. A worker may attempt to execute each local job in accordance with the operation distribution and prescribed load (e.g., transaction frequency and/or number of concurrent connections) specified in the corresponding job description. A worker may attempt to execute each local job for the duration specified in the corresponding job description.

As indicated in 280, the controller responsible for enqueuing the job descriptions may determine whether the next subdivision of time has been reached. If so, then the controller may enqueue the next set of job descriptions, i.e., the job descriptions intended to be executed during the current subdivision of the total test duration, as indicated in 215. If not, then the controller may wait for the next subdivision of time to be reached, as indicated in 285. In this manner, a load step may be broken down into finer-grained jobs for shorter periods of time. If each worker is executing each job for a relatively short duration of time, such as one minute, then it may be easier for the scalable load testing system 100 to shut down the load test in a quick and efficient manner. Additionally, the scalable load testing system 100 may adjust the amount of resources, e.g., the number of workers, in a more responsive manner.

Figure 3A:
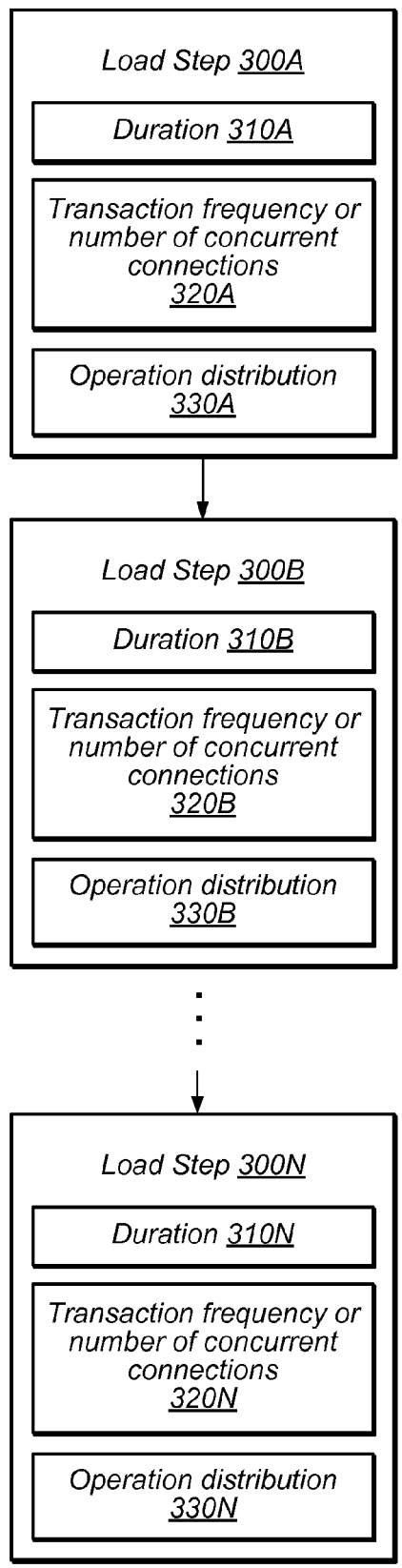
FIG. 3A illustrates an example of load steps usable for scalable load testing, according to one embodiment.

FIG. 3A illustrates an example of load steps usable for scalable load testing, according to one embodiment. A load test of a service may include multiple steps of load. The load steps may vary based on various characteristics, and the load steps may be ordered to vary the characteristics of the load test over time. For example, a first load step 300A may be placed before a second load step 300B in a load test. The load steps may be ordered in this manner until a final load step 300N. Although three load steps 300A, 300B, and 300N are shown for purposes of illustration and example, it is contemplated that any number and configuration of load steps may be used with the scalable load testing system 100.

Each load step may specify a duration of time for which the load should be generated. For example, the first load step 300A may specify a duration 310A, the second load step 300B may specify a duration 310B, and the final load step 300N may specify a duration 310N. Any of the durations 310A, 310B, and 310N may differ from one another. Each load step may specify a prescribed load to be generated, such as a transaction frequency (e.g., a number expressed in transactions per second) or a number of concurrent connections. For example, the first load step 300A may specify a transaction frequency or number of concurrent connections 320A, the second load step 300B may specify a transaction frequency or number of concurrent connections 320B, and the final load step 300N may specify a transaction frequency or number of concurrent connections 320N. Any of the prescribed loads 320A, 320B, and 320N may differ from one another in quantity and/or type of load. Each load step may specify a distribution of operations associated with the load to be generated. For example, the first load step 300A may specify an operation distribution 330A, the second load step 300B may specify an operation distribution 330B, and the final load step 300N may specify an operation distribution 330N. Any of the operation distributions 330A, 330B, and 330N may differ from one another.

The operation distribution may indicate the different transaction types to be performed and the percentage of the total for each transaction type. For example, an operation distribution may specify 30% write operations and 70% read operations. Additionally, a load step may include or reference one or more sets of program code to be executed to implement the job. The program code may be executable to generate a synthetic load based on the parameters of the test job description. In some embodiments, different transaction types in the operation distribution may have their own sets of program code. For some transaction types, the program code may be executable to generate values within a predetermined range of input data.

The nature of a test job may vary based on the nature of the service to be load tested. For example, if the service under test is associated with an electronic commerce (e-commerce) merchant, then the service may be configured to perform one or more suitable operations such as generating a web page (e.g., a product description page for a product offered for sale by the merchant), completing a sale or other transaction between the merchant and a customer, verifying a payment presented by the customer, etc. Each test job may comprise data associated with a plurality of transactions or other operations that are processed by the service. The jobs may vary in the transaction frequency (e.g., transactions per second) they are expected to maintain or in the number of concurrent connections that are expected to establish. In some embodiments, the data associated with the test jobs may be generated by sampling actual production transactions and/or by generating synthetic transactions.

Figure 3B:
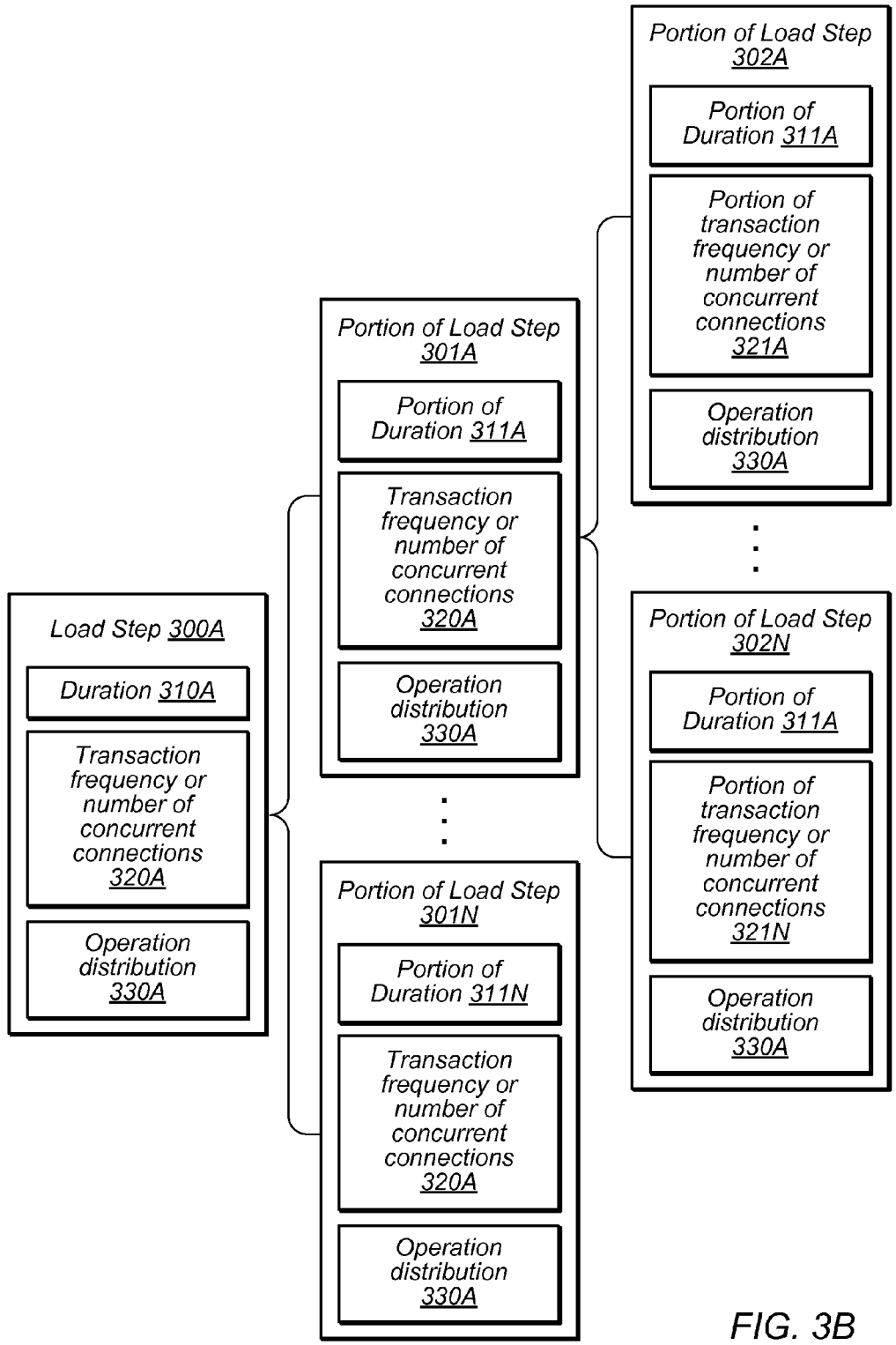
FIG. 3B illustrates an example of finer-grained load jobs usable for scalable load testing, according to one embodiment.

FIG. 3B illustrates an example of finer-grained load jobs usable for scalable load testing, according to one embodiment. In one embodiment, a load step may be broken down into finer-grained load jobs by duration and also by prescribed load. For example, if a load step specifies a total duration of five minutes and a total transaction frequency of 1000 transactions per second (TPS), then the controller may generate test jobs of smaller durations (e.g., one minute each) and smaller transaction frequencies (e.g., 10 TPS each). The load steps may be divided into elements of a higher granularity based on a user-specified granularity or a default granularity, for example. In one embodiment, the jobs generated for a particular load step may collectively represent the total prescribed load over the total duration of time specified by the load step. For example, if the load step specifies a total transaction frequency of 1000 TPS for a duration of three minutes, then the controller may generate 100 test jobs that each specify a transaction frequency of 10 TPS for a first minute, 100 test jobs that each specify a transaction frequency of 10 TPS for a second minute, and 100 test jobs that each specify a transaction frequency of 10 TPS for a third minute. In one embodiment, the duration and the prescribed load may be evenly divided across the test jobs.

As shown in the example of FIG. 3B, the load step 300A may first be broken down by subdivisions of the duration 310A. In one embodiment, a maximum duration may be configured for jobs. If the duration 310A (e.g., three minutes) is longer than the maximum duration (e.g., one minute), then the controller may generate intermediate load steps 301A-301N to represent the distribution of the prescribed load across subdivisions of the total duration 310A. In one embodiment, the portions or subdivisions of the total duration may be limited to the maximum duration. Accordingly, a first portion 301A of the load step may represent a first portion 311A (e.g., a first minute) of the total duration, a final portion 301N of the load step may represent a final portion 311N (e.g., a final minute) of the total duration, and any intermediate portions of the load step may represent intermediate portions of the total duration.

As shown in the example of FIG. 3B, the load step 300A may then be broken down by subdivisions of the prescribed load (e.g., transaction frequency or number of concurrent connections) 320A. The jobs may be generated based on a maximum prescribed load per job, such as 10 TPS or 5 concurrent connections. In one embodiment, each portion 301A-301N of the load step (e.g., each portion limited to the maximum duration and specifying the total prescribed load) may be subdivided into jobs specifying portions of the total prescribed load. Accordingly, one portion 302A of the portion 301A of the load step 300A may represent a portion of 321A of the prescribed load 320A for the first portion 311A (e.g., a first minute) of the total duration 310A, another portion 302N of the portion 301A of the load step 300A may represent a portion 321N of the prescribed load 320A for the first portion 311A (e.g., a first minute) of the total duration 310A, and any intermediate portions of the load step may represent intermediate portions of the total duration for portions of the prescribed load.

In general, for a desired job size of no more than x seconds and no more than y transactions per second, a load of m seconds and n transactions per second may first be divided into m/x consecutive steps of n transactions per second. This in turn may be divided into n/y parallel steps of load. Each step may then be no more than y seconds long and no more than y TPS. For example, if the load step 300A specifies a total transaction frequency of 1000 TPS for a duration of three minutes, then the controller may generate 100 test jobs that each specify a transaction frequency of 10 TPS for a first minute, 100 test jobs that each specify a transaction frequency of 10 TPS for a second minute, and 100 test jobs that each specify a transaction frequency of 10 TPS for a third minute. Within each time period, the jobs generated for a load step are expected to be performed in a substantially concurrent manner. In one embodiment, the duration and the prescribed load may be evenly divided across the test jobs.

Figure 4:
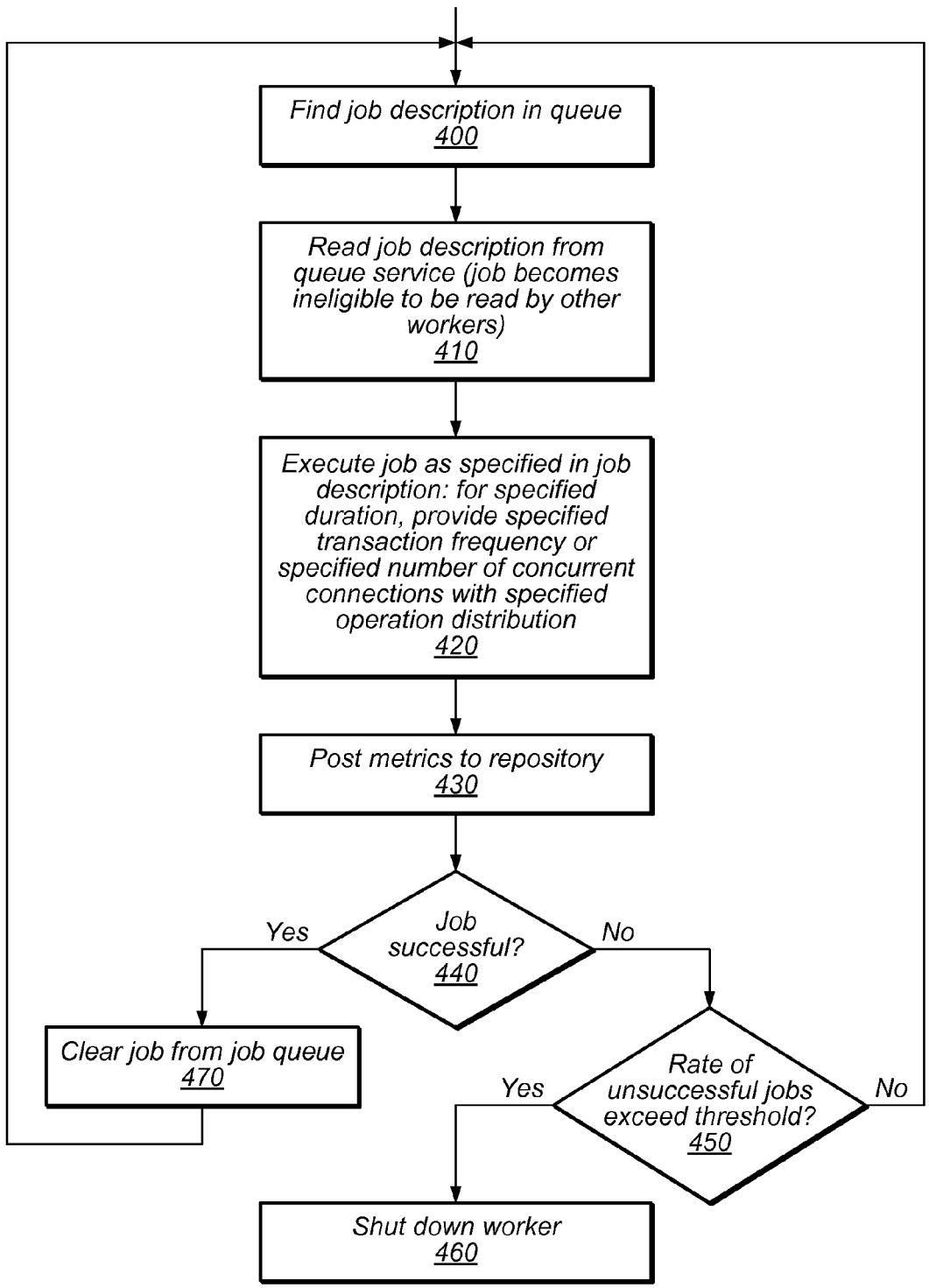
FIG. 4 is a flowchart illustrating a method for workers executing test jobs in a scalable load testing system, according to one embodiment.

FIG. 4 is a flowchart illustrating a method for workers executing test jobs in a scalable load testing system, according to one embodiment. In general, workers (e.g. workers 160A-160N in FIG. 1) may access job descriptions (also referred to herein as "jobs") from a job queue (e.g. jobs 140A-140N in queue 130) and execute the jobs to perform a load test of a service. As indicated in 400, a worker may access a job queue to find a job. For example, jobs may be ordered by age in the job queue. When a worker accesses the job queue for a job, the oldest available (e.g., untaken) job may be indicated to the worker.

As indicated in 410, a job description may be read from the queue by a worker. In one embodiment, the queue service may mark the job as "taken" after the job is read from the queue. A job marked as "taken" may be ineligible to be read by other workers, but the job may remain in the queue. In one embodiment, if the job fails to complete, the job may be marked as "untaken" so that the job is again available for a worker to access.

As indicated in 420, a local job corresponding to the job description may be executed by the worker. The local job may be executed as specified in the job description. For example, the job may be executed for the duration specified in the job description. The job may be executed to provide the load specified in the job description, such as the specified transaction frequency or the specified number of concurrent connections. Additionally, the job may be executed with the operation distribution specified in the job description.

In some embodiments, one or more performance metrics for the worker may be monitored, e.g., during the execution of the job. As indicated in 430, the metrics may be posted to an external entity such as a repository. The repository may be accessed by a suitable component such as an auto-scaler or a controller to determine the status of the load test. Examples of the metrics posted may include the success and/or failure of the job, the latency associated with particular aspects of the job (e.g., requests and/or responses), the amount of data sent in executing the job, etc. In one embodiment, the metrics for all workers may be aggregated to permit an assessment of the health of the service under test. This information may also be used for an auto-shutdown process of the test, as described below.

As indicated in 440, the success or failure of the execution of the job may be determined. As indicated in 470, once the job completes, notification may be sent by the worker to the queue to indicate that the job can be deleted from the queue. The worker that processed the completed job may then access the next untaken job in the job queue, e.g., by returning to the operation indicated in 400.

As indicated in 450, if the job was not successful, then the rate of unsuccessful jobs may be checked to determine if the rate exceeds a threshold. For example, a job may be unsuccessful if it does not complete within a given time period. The failure of a job may be due to a worker stopping its processing, a systemic issue in the service under test, a network problem, etc. The threshold may be put in place to ensure that a worker is processing the jobs at a satisfactory rate. In one embodiment, the success rate of a given worker may be compared to a threshold. As indicated in 460, if the threshold has been exceeded, then the worker may shut down. The worker may be automatically shut down by auto-shutdown module 180 as depicted in FIG. 1. If the threshold has not been exceeded, then the worker may return to the operation shown in 400 to access the next available job.

As discussed above, when a job fails, if the threshold for the rate of unsuccessful jobs has not been exceeded, the worker may return to the queue to find the next job (e.g., as shown in 400). If the job completes successfully, the worker may also return to the queue to find the next job (e.g., as shown in 400). A given worker may, in some embodiments, begin a new job while waiting from acknowledgment from the service that the request(s) for a job have been received or completed. Multiple jobs may be processed by multiple workers in a concurrent or parallel manner.

Figure 5:
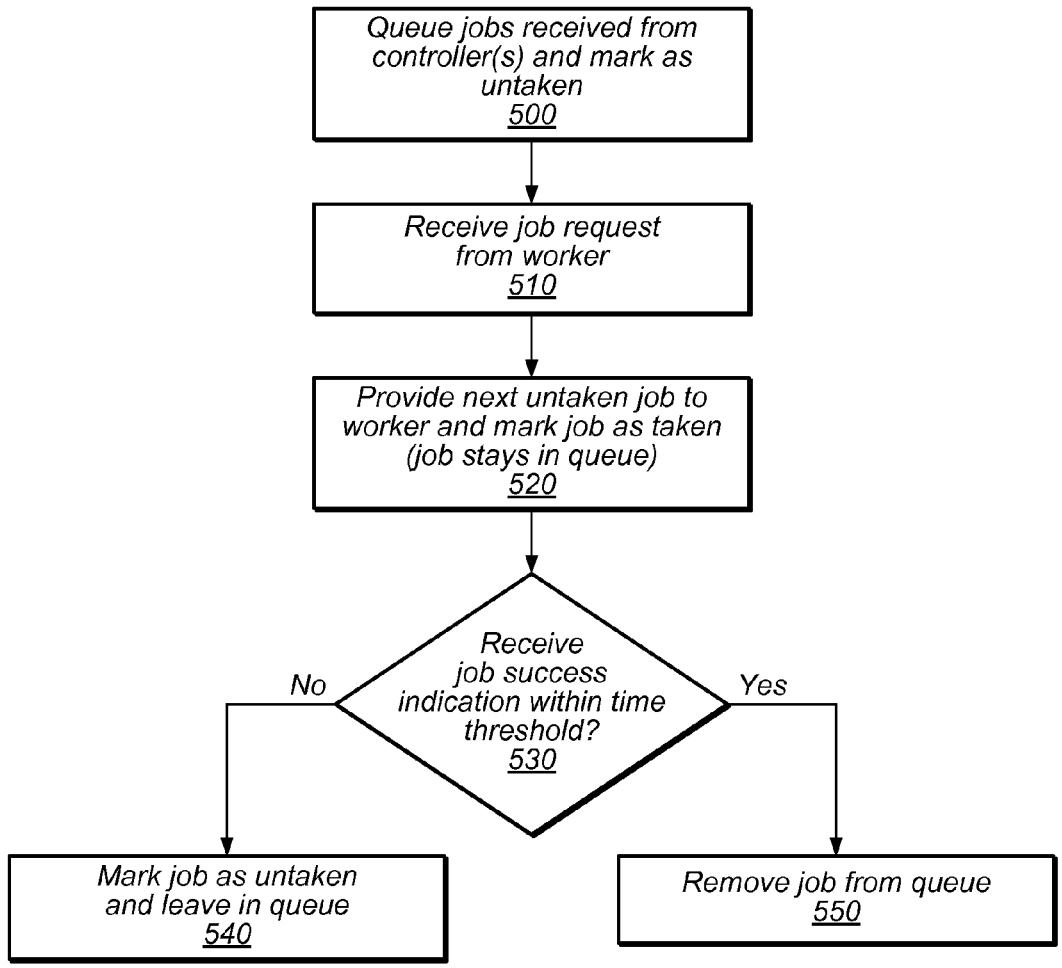
FIG. 5 is a flowchart illustrating a method for job queue management of test jobs in a scalable load testing system, according to one embodiment.

FIG. 5 is a flowchart illustrating a method for job queue management of test jobs in a scalable load testing system, according to one embodiment. In general, a job queue (e.g., queue 130 in FIG. 1) may be implemented to facilitate efficient workflows in scalable load testing system 100. The queue may be implemented either internally or externally to the scalable load testing system 100. As discussed above with respect to FIG. 1, the queue may be implemented by a queue service that manages queue data and communicates with entities such as the controllers 110A-110N and the workers 160A-160N. The job executor 150 may typically process many tasks in parallel, and the use of the job queue may ensure that the next task is available as a prior task completes. In addition, in the scalable load testing system 100, the job queue 130 may effectively decouple the controllers 110A-110N from the workers 160A-160N. As a result, the controllers and workers may scale separately and independently from each other.

To manage the queue, the jobs may be marked to indicate their status. As indicated in 500, jobs may be received from one or more controllers and marked in the queue as untaken. Marking the jobs as untaken may indicate that the jobs are available for access by a worker. As indicated in 510, a request for a job may be received by the queue from a worker.

As indicated in 520, the next untaken job may be provided to the worker, and the job may be marked as taken in the queue. However, the job may remain in the queue until notification of the job's completion is received. Marking the job as taken may ensure that another worker does not access the job while it is in progress.

In one embodiment, jobs may be expected to complete within a time threshold. Accordingly, as indicated in 530, it may be determined whether an indication of job success was received (e.g., by the queue) within the time threshold. In one embodiment, if the job does not complete within a particular time threshold, then the job may be marked as untaken in the queue, as indicated in 540. Marking the job as untaken may make the job available in the queue for another worker to request. In one embodiment, if the indication of job success was received prior to the time threshold, then the job may be removed from the queue, as indicated in 550.

Figure 6:
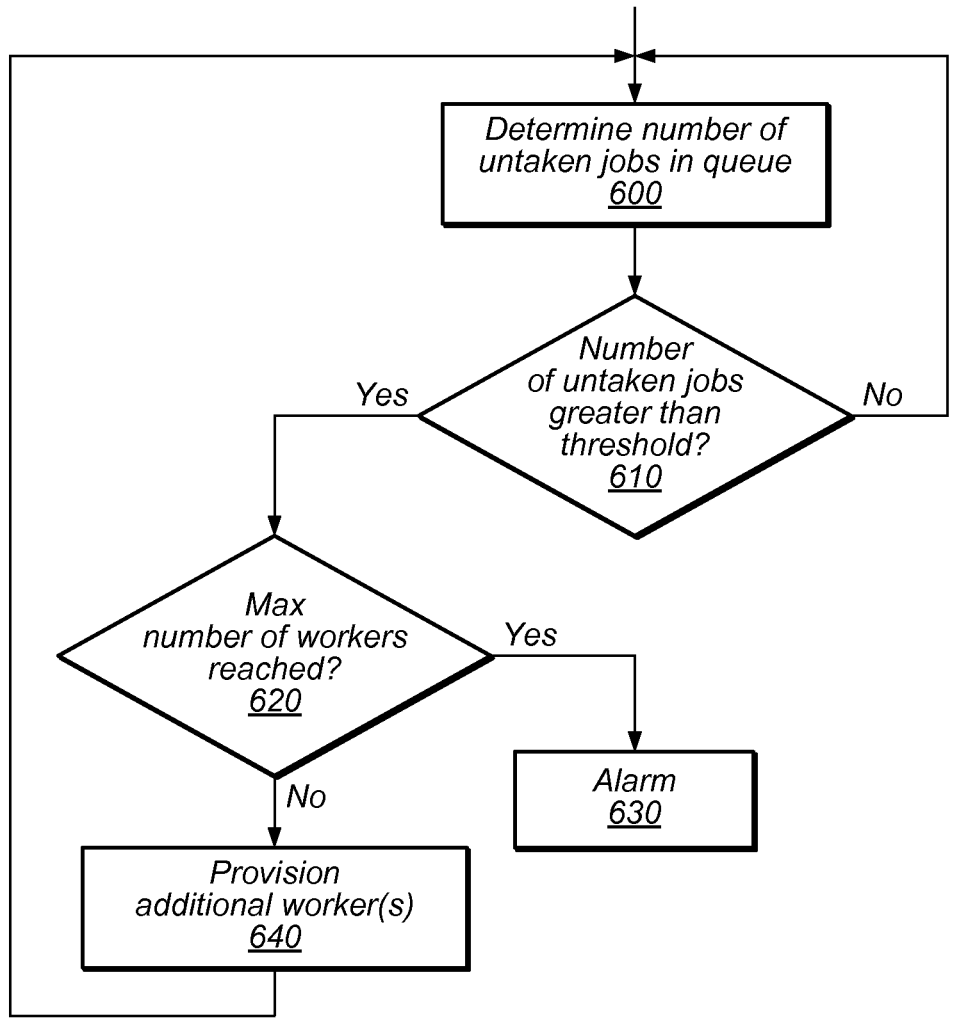
FIG. 6 is a flowchart illustrating a method for auto-scaling workers in response to job metrics in a scalable load testing system, according to one embodiment.

FIG. 6 is a flowchart illustrating a method for auto-scaling workers in response to job metrics in a scalable load testing system, according to one embodiment. In general, auto-scaling may ensure that a load test is implemented with a sufficient amount of compute resources (e.g., workers) to provide the prescribed load. The different load steps may utilize different numbers of controllers and workers at different times. Scaling may be performed to ensure that adequate resources are provided for a load test and to avoid under-utilization of resources (e.g., compute and memory resources for workers and controllers). In one embodiment, one indicator of auto-scaling success is that the number of jobs in the job queue maintains an appropriate size, e.g., a size approaching zero.

As indicated in 600, the number of untaken jobs in the queue may be determined. As discussed above, untaken jobs may be jobs that are available to a worker for execution as part of a load test. In one embodiment, the auto-scaler (e.g., auto-scaler 170 in FIG. 1) may determine the number of untaken jobs via a job quantity metric. As discussed above, jobs may be continually placed in the job queue (e.g., by one or more controllers) according to the requirements of one or more load steps. In one embodiment, the auto-scaler is configured to maintain a minimal queue size and to ensure that once a job is place in the queue, it is accessed and processed in a suitable time frame.

As indicated in 610, the number of untaken jobs may be compared to a threshold, e.g., by the auto-scaler. If the number is below the threshold, then the auto-scaler may return to the operation shown in 600 and continue to monitor the number of untaken jobs in the job queue.

As indicated in 620, if the number of untaken jobs is greater than the threshold, then the auto-scaler may determine if more workers can be added. In one embodiment, predetermining a maximum number of workers may ensure the health of the scalable load testing system 100. If the maximum number of workers has been reached, and if scaling up the number of workers would exceed the maximum number of workers, then as indicated in 630, an alarm may be generated. The alarm may be utilized to ensure that the number of workers does not grow unchecked. In one embodiment, the alarm may serve as an alert to one or more users. In one embodiment, the alarm may initiate auto-shutdown (e.g., by auto-shutdown module 180 in FIG. 1) of the scalable load testing system 100 or any of its components.

As indicated in 640, if the maximum number of workers has not been reached, then one or more additional workers may be provisioned. Provisioning additional workers (e.g., scaling up) may ensure that untaken jobs continue to be accessed and executed in a suitable time frame. After provisioning the one or more additional workers, the auto-scaler may continue the monitoring process, as indicated in 600.

Figure 7:
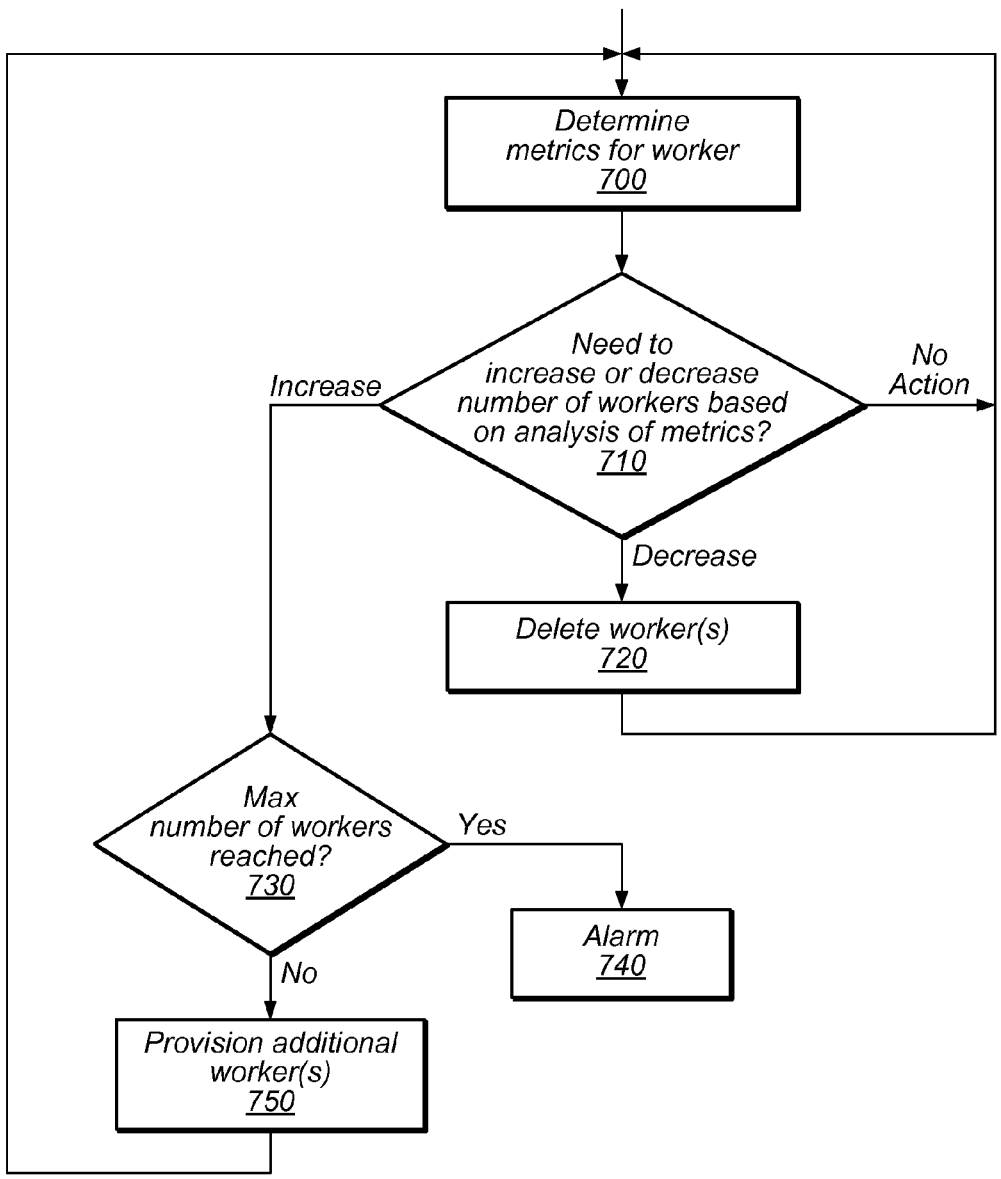
FIG. 7 is a flowchart illustrating a method for auto-scaling the number of workers in response to system metrics in a scalable load testing system, according to one embodiment.

FIG. 7 is a flowchart illustrating a method for auto-scaling the number of workers in response to system metrics in a scalable load testing system, according to one embodiment. As discussed above, auto-scaling may ensure that a load test is implemented with a sufficient amount of compute resources (e.g., workers) to provide the prescribed load. The test load on the service may vary over time according to the load steps being implemented. Auto-scaling may be implemented from one load step to the next to mitigate the existence of idle compute resources or the insufficiency of the compute resources involved in the load test. In one embodiment, an auto-scaling process may monitor key metrics of the scalable load testing system 100 to determine if auto-scaling is needed. The metrics may indicate aspects of the performance of various elements or resources such as memory resources, processors, disk resources, network resources, etc.

As indicated in 700, one or more performance metrics for workers may be determined using any appropriate monitoring techniques. In one embodiment, a predetermined threshold or operational criterion may be determined for each metric. As indicated in 710, based on the metrics, the auto-scaler may determine if the number of workers needs to increase, decrease, or stay the same. For example, if CPU or memory usage for a worker is too high, the worker may not be able to keep up with the test job rate, and one or more additional workers should be provisioned. In one embodiment, if the metrics indicate that usage meets one or more particular criteria or that usage has not fallen below a particular threshold, then no action may be taken, and the auto-scaler may continue to monitor the hardware metrics, as indicated in 700.

As indicated in 720, one or more workers may be deleted or removed from operation based on the analysis of metrics in 710. For example, if the metrics have fallen below a predetermined criterion or threshold, the workers may be idle or under-utilized. In one embodiment, idle workers may be removed from the scalable load testing system 100. In one embodiment, however, a minimum number of workers may be maintained. Once the minimum is reached, no more workers may be deleted during the load test.

Based on the analysis of the metrics in 710, it may be determined that the number of workers may need to increase. As indicated in 730, the number of workers may be evaluated to determine if a maximum number has been reached. In one embodiment, a maximum number of workers may be maintained to ensure the health of the scalable load testing system 100. If the maximum number of workers has been reached, then as indicated in 740, an alarm may be generated. The alarm may be utilized to ensure that the number of workers does not grow unchecked. In one embodiment, the alarm may serve as an alert to one or more users. In one embodiment, the alarm may initiate auto-shutdown (e.g., by auto-shutdown module 180 in FIG. 1) of the scalable load testing system 100 or any of its components. If the maximum number of workers has not been reached, then one or more additional workers may be provisioned, as indicated in 750. Once the additional workers are provisioned, the metrics may continue to be monitored, as indicated in 700.

Figure 8:
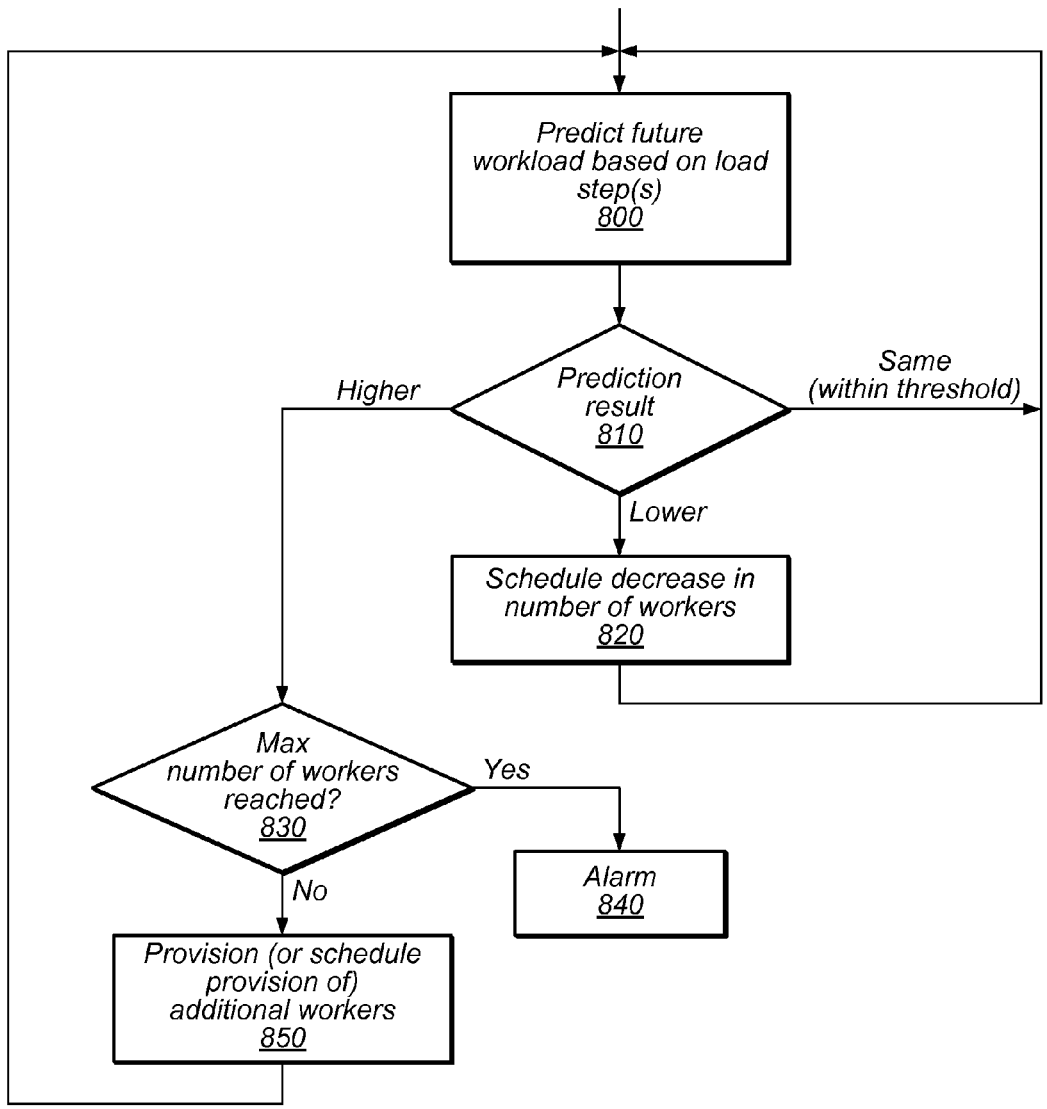
FIG. 8 is a flowchart illustrating a method implementing predictive auto-scaling in a scalable load testing system, according to one embodiment.

FIG. 8 is a flowchart illustrating a method implementing predictive auto-scaling in a scalable load testing system, according to one embodiment. In one embodiment, the auto-scaling of workers may be performed in a predictive manner. As described above, multiple load steps may be provided for use in a load test. Accordingly, it may be possible to predict increases in the load from load step to load step. For example, advance knowledge of increasing loads may indicate a need for more workers in the near future. Conversely, advance knowledge of decreasing loads may indicate an opportunity to decrease the number of workers in the near future.

As indicated in 800, the future workload may be predicted based on analysis of one or more load steps associated with a load test. In one embodiment, the future workload may be predicted by the auto-scaler 170. The predicted future workload may be associated with a particular time frame. As indicated in 810, based on the results of the prediction, it may be determined that the number of workers should increase, decrease, or stay the same. In one embodiment, if the prediction indicates that the workload will be unchanged over the time frame, then the number of workers may be maintained, and the method may return to the operation shown in 800.

As indicated in 820, based on the results of the prediction, a decrease in workers may be scheduled. The method may return to the operation shown in 800. As indicated in 830, based on the results of the prediction, it may be determined that an increase in workers is needed. However, the current number of workers may be evaluated to determine if a maximum number of workers has been reached. If the maximum number of workers has been reached, then as indicated in 840, an alarm may be generated. The alarm may be utilized to ensure that the number of workers does not grow unchecked. In one embodiment, the alarm may serve as an alert to one or more users. In one embodiment, the alarm may initiate auto-shutdown (e.g., by auto-shutdown module 180 in FIG. 1) of the scalable load testing system 100 or any of its components.

If the maximum number of workers has not been reached, then one or more additional workers may be provisioned, as indicated in 850. In one embodiment, the provisioning of the additional worker(s) may be scheduled for the future, e.g., based on a point in time at or before the point in time when the need for the additional worker(s) is anticipated. Once the additional workers are provisioned, the method may return to the operation shown in 800.

In one embodiment, the methods of FIG. 6, FIG. 7, and/or FIG. 8 may be combined. Accordingly, both performance metrics for workers and the size of the job queue may be monitored to determine whether auto-scaling of the workers would be beneficial. Monitoring both the metrics and the length of the job queue may ensure that resources are used effectively. Additionally, predictive auto-scaling may be based on anticipated performance metrics for workers (e.g., based on observed rates of change) and/or the anticipated size of the job queue (e.g., based on observed rates of change).

Figure 9:
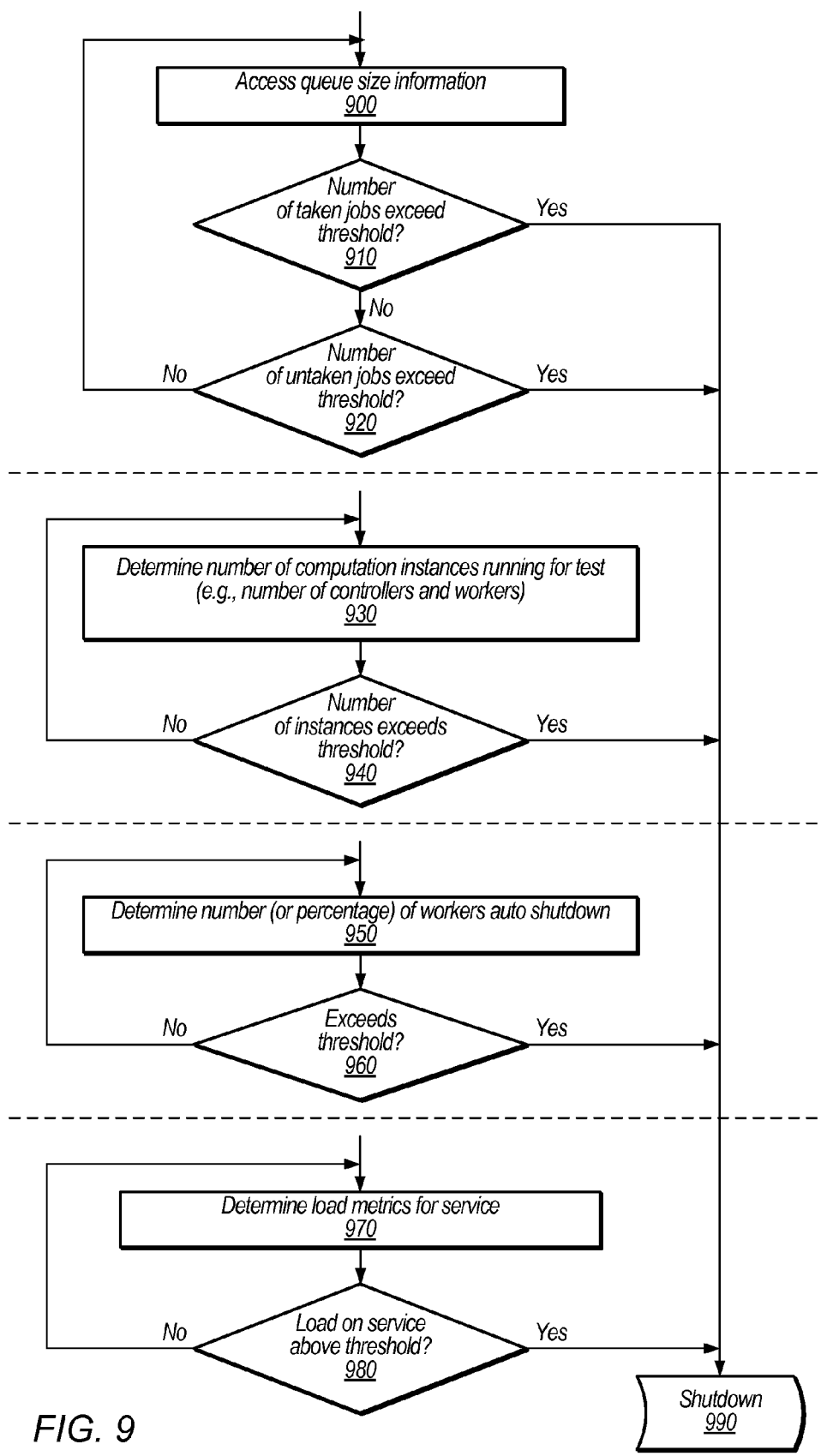
FIG. 9 is a flowchart illustrating a method for auto-shutdown of a scalable load testing system, according to one embodiment.

FIG. 9 is a flowchart illustrating a method for auto-shutdown of a scalable load testing system, according to one embodiment. In one embodiment, an auto-shutdown may be initiated (e.g., by auto-shutdown module 180 in FIG. 1) if any of various criteria are met during a load test. As indicated in 900, the queue size information may be accessed. The size of the queue may indicate whether the number of workers is sufficient to execute the test jobs generated based on the load step(s). In a properly provisioned load testing system 100, the number of jobs in the job queue may be very small at most times. As indicated in 910, if the number of taken jobs (i.e., jobs marked as taken but remaining in the queue) exceeds a given threshold, then auto-shutdown may occur, as indicated in 990. As indicated in 920, if the number of taken jobs has not exceeded the threshold, then the number of untaken jobs may be evaluated to determine if another threshold has been exceeded. If the threshold for untaken jobs has been exceeded, then auto-shutdown may occur, as indicated in 990. If neither threshold has been exceeded, then the queue size may continue to be monitored, as indicated in 900.

In one embodiment, the number of compute instances in the load test may be monitored. In one embodiment, monitoring the number of compute instances may be performed in parallel with monitoring the queue size as discussed above. As indicated in 930, the number of controllers and/or workers may be determined. If the number of controllers and/or workers exceeds a threshold, as indicated in 940, then auto-shutdown may occur, as indicated in 990. If the number has not exceeded the threshold, then the number of controllers and/or workers may continue to be monitored, as indicated in 930.

As indicated in 950, the number of workers that are shutting themselves down or being shut down may be monitored. Monitoring the number of workers shut down may be performed in addition to monitoring the queue size and/or number of compute instances as described above. As indicated in 960, if the number of workers that are shutting themselves down exceeds a threshold, then auto-shutdown may occur, as indicated in 990. If the number has not exceeded the threshold, then the number of workers that have been shut down may continue to be monitored, as indicated in 950.

As indicated in 970, load metrics for the service under test may be monitored. Monitoring the health of the service as indicated at 970 may be performed in parallel to monitoring the queue size, compute instances, and/or number of workers shut down. Examples of load metrics may include metrics relating to memory, CPU, disk and/or network usage of the service under test. For example, if the CPU usage exceeds 90% on at least half of the compute resources in use for more than thirty minutes, then auto-shutdown may occur. In one embodiment, if any one of the load metrics indicates that the load on the production service is above a threshold, as indicated in 980, then auto-shutdown may occur, as indicated in 990. If the load metrics are not above the thresholds, then the load metrics may continue to be monitored, as indicated in 970.

As discussed above, the queue size, number of compute instances, number of workers, and/or load metrics may be monitored in parallel. In some embodiments, any one of these or a combination of these may indicate a need to shut down the scalable load testing system 100. Shutting down the scalable load testing system 100 may include, for example, deleting the queue, deleting or de-provisioning the workers, deleting or de-provisioning the controllers, or any combination thereof.

Illustrative Computer System

In at least some embodiments, a computer system that implements a portion or all of one or more of the technologies described herein, such as the scalable load testing system 100, may include a general-purpose computer system that includes or is configured to access one or more computer-readable media. FIG. 10 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above with respect to FIGS. 1 through 9 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more computers configured to implement a load testing system, wherein the load testing system comprises:
      one or more controllers configured to generate a plurality of test job descriptions based on a load step description, wherein the load step description specifies a total test duration for a load test of a service, wherein the load step description specifies a distribution of operation types that includes different types of operations for the load test of the service, wherein the load step description specifies a total transaction frequency or a total number of concurrent connections for the load test of the service, wherein individual test job descriptions of the plurality of test job descriptions specify respective portions of the total test duration, wherein the individual test job descriptions of the test job descriptions specify respective portions of the total transaction frequency or respective portions of the total number of concurrent connections, and wherein the individual test job descriptions of the test job descriptions specify respective portions of the distribution of operation types;
      a job queue configured to receive and queue the test job descriptions from the one or more controllers; and
      a plurality of workers, wherein individual workers of the plurality of workers are configured to:
         read one or more of the test job descriptions from the job queue;
         execute one or more jobs based on the test job descriptions read from the job queue, wherein the one or more jobs are executed for the respective portions of the total test duration in the corresponding test job descriptions, wherein the one or more jobs are executed according to the respective portions of the total transaction frequency or the respective portions of the total number of concurrent connections in the corresponding test job descriptions, and wherein the one or more jobs are executed according to the respective portions of the distribution of operation types; and
         monitor one or more of its own system metrics during execution of the one or more jobs and determine, based at least in part on its own system metrics, whether to read an additional test job description from the job queue.

2. The system as recited in claim 1, wherein individual workers of the plurality of workers are further configured to:
   determine whether at least one of the one or more of its own system metrics exceeds a respective performance threshold; and
   suspend reading the test job descriptions from the job queue while at the least one of the one or more of its own system metrics exceeds the respective performance threshold.

3. The system as recited in claim 1, wherein the one or more controllers are further configured to:
   determine whether the length of the job queue exceeds a threshold; and
   add additional workers to the plurality of workers in response to determining that the length of the job queue exceeds the threshold.

4. A computer-implemented method, comprising:
   generating, by a controller, a plurality of job descriptions based on a load step description, wherein the load step description specifies a total prescribed load for a load test of a service over a period of time, wherein the load step description specifies a distribution of operation types that includes different types of operations for the load test of the service, wherein the load step description specifies a total transaction frequency or a total number of concurrent connections for the load test of the service, and wherein the individual job descriptions specify respective subdivisions of the total prescribed load, respective portions of the total transaction frequency or a total number of concurrent connections, and respective portions of the distribution of operation types;
   placing the job descriptions in a job queue, wherein individual job descriptions are read from the job queue and implemented as executable jobs by individual worker hosts of a plurality of worker hosts;
   reading, by respective worker hosts of the plurality of worker hosts, one or more of the test job descriptions from the job queue;
   executing, by respective worker hosts of the plurality of worker hosts, one or more jobs based on the test job descriptions read from the job queue; and
   monitoring, by respective worker hosts of the plurality of worker hosts, one or more of its own system metrics during execution of the one or more jobs and determining, based at least in part on its own system metrics, whether to read an additional test job description from the job queue.

5. The method as recited in claim 4, further comprising:
Determining that the length of the job queue exceeds a threshold; and
requesting allocation of one or more additional worker hosts in response to determining that the length of the job queue exceeds the threshold.

6. The method as recited in claim 4, wherein the load step description specifies the period of time for the load test of the service, and wherein the job descriptions specify respective subdivisions of the period of time.

7. The method as recited in claim 4, further comprising:
monitoring one or more system metrics at the worker hosts during execution of the executable jobs;
determining that at least one of the one or more system metrics exceeds a corresponding performance threshold for at least one of the worker hosts; and
suspending reading of the job descriptions from the job queue by the at least one of the worker hosts while at least one of the one or more system metrics exceeds the corresponding performance threshold.

8. The method as recited in claim 4, further comprising:
monitoring one or more system metrics at the worker hosts during execution of the executable jobs;
determining that the one the one or more system metrics exceed a performance threshold; and
allocating one or more additional worker hosts in response to determining that the one or more system metrics exceed the performance threshold.

9. A system, comprising:
a controller comprising at least one processor and a memory in communication with the at least one processor, wherein the memory stores program instructions, wherein the program instructions are executable by the at least one processor to:
generate a plurality of job descriptions based on a load step description, wherein the load step description specifies a total transaction frequency or a total number of concurrent connections for a load test of a service over a period of time, wherein the load step description specifies a distribution of operation types that includes different types of operations for the load test of the service, wherein the job descriptions specify subdivisions of the total transaction frequency or subdivisions of the total number of concurrent connections, and wherein the job descriptions specify respective subdivisions of the period of time and specify respective portions of the distribution of operation types; and
enqueue the job descriptions in a job queue; and
a plurality of worker hosts configured to:
dequeue, by individual worker hosts of the plurality of worker hosts, individual job descriptions of the job descriptions from the job queue, wherein a particular worker host is configured to determine, based at least in part on system metrics of the particular worker host, whether to dequeue a particular job description of the job descriptions; and
concurrently execute a plurality of jobs based on the individual job descriptions of the dequeued job descriptions.

10. The system as recited in claim 9, wherein the program instructions are further executable by the at least one processor to:
determine that the length of the job queue exceeds a threshold; and
request allocation of one or more additional worker hosts in response to determining that the length of the job queue exceeds the threshold.

11. The system as recited in claim 9, wherein a particular worker host of the worker hosts is further configured to:
monitor one or more of the system metrics of the particular worker host during execution of individual jobs of the jobs;
determine whether the one or more system metrics exceeds a corresponding performance threshold; and
suspend the dequeuing by the particular worker host of the individual job descriptions of the job descriptions from the job queue while the one or more system metrics of the particular worker host exceeds the corresponding performance threshold.

12. The system as recited in claim 9, wherein the program instructions are further executable by the at least one processor to:
configure the automatic allocation of one or more additional worker hosts, wherein the program instructions are executable by the at least one processor to specify one or more thresholds for system metrics at the worker hosts, wherein the automatic allocation is triggered by the system metrics meeting the one or more thresholds or is triggered by the system metrics exceeding the one or more thresholds.

13. A non-transitory computer-readable storage medium storing program instructions computer-executable to perform:
generating a plurality of job descriptions based on a load step description, wherein the load step description specifies a prescribed load for a load test of a service over a period of time, wherein the load step description specifies a distribution of operation types that includes different types of operations for the load test of the service, wherein the load step description specifies a total transaction frequency or a total number of concurrent connections for the load test of the service, wherein the individual job descriptions specify respective subdivisions of the total prescribed load, wherein the individual job descriptions specify respective portions of a total transaction frequency or a total number of concurrent connections, and wherein the individual job descriptions of the job descriptions specify respective portions of the distribution of operation types;
placing the job descriptions of the plurality of job descriptions in a job queue;
reading, by a worker host, one or more of the job descriptions from the job queue, wherein individual job descriptions of the job descriptions specify subdivisions of the total transaction frequency or subdivisions of the total number of concurrent connections, wherein individual job descriptions of the job descriptions specify subdivisions of the period of time, and wherein the individual job descriptions of the job descriptions specify respective portions of the distribution of operation types;
executing, by the worker host, a first set of one or more jobs based on individual job descriptions of the job descriptions during a first subdivision of the period of time;
monitoring, by the worker host, one or more system metrics during execution of the one or more jobs; and
determining by the worker host, based at least in part on the one or more system metrics monitored, whether to dequeue a second set of one or more of the job descriptions during a second subdivision of the period of time.

14. The non-transitory computer-readable storage medium as recited in claim 13, wherein the program instructions are further computer-executable to perform:
- determining that the one or more system metrics exceed a performance threshold; and
- suspending the reading of the job descriptions from the job queue while the one or more system metrics exceed the performance threshold.

15. The non-transitory computer-readable storage medium as recited in claim 14, wherein the program instructions are further computer-executable to perform:
- determining that the one or more system metrics do not exceed the performance threshold; and
- resuming the reading of the job descriptions from the job queue in response to determining that the one or more system metrics do not exceed the performance threshold.

16. The non-transitory computer-readable storage medium as recited in claim 13, wherein the program instructions are further computer-executable to perform:
- determining that the length of the job queue exceeds a threshold; and
- allocating one or more additional worker hosts in response to determining that the length of the job queue exceeds the threshold.

17. The non-transitory computer-readable storage medium as recited in claim 13, wherein the program instructions are further computer-executable to perform:
- determining that the one or more system metrics exceed a performance threshold; and
- allocating one or more additional worker hosts in response to determining that the one or more system metrics exceed the performance threshold.

* * * * *